US012617565B2

(12) United States Patent
Handel

(10) Patent No.: US 12,617,565 B2
(45) Date of Patent: May 5, 2026

(54) METHOD FOR PRODUCING INDIVIDUAL DOSING QUANTITIES VIA A DRUM DOSING DEVICE

(71) Applicant: Harro Hoefliger Verpackungsmaschinen GmbH, Allmersbach im Tal (DE)

(72) Inventor: Bernhard Handel, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 135 days.

(21) Appl. No.: 18/795,918

(22) Filed: Aug. 6, 2024

(65) Prior Publication Data

US 2025/0058910 A1 Feb. 20, 2025

(30) Foreign Application Priority Data

Aug. 17, 2023 (EP) .................................... 23191975

(51) Int. Cl.

*B65B 1/36* (2006.01)
*A61J 3/07* (2006.01)
*B65B 37/20* (2006.01)

(52) U.S. Cl.

CPC ................. *B65B 1/363* (2013.01); *A61J 3/07* (2013.01); *B65B 37/20* (2013.01); *A61J 2200/70* (2013.01)

(58) Field of Classification Search

CPC ................................ B65D 1/363; B65D 37/20
See application file for complete search history.

(56) References Cited

U.S. PATENT DOCUMENTS

| | | | | |
|---|---|---|---|---|
| 2005/0023297 | A1* | 2/2005 | Zill | B65B 1/385 222/189.06 |
| 2014/0353260 | A1* | 12/2014 | Harkonen | B01D 33/463 210/770 |
| 2020/0047924 | A1* | 2/2020 | Brecht | G01F 11/24 |
| 2020/0047926 | A1* | 2/2020 | Brecht | B65B 1/36 |

FOREIGN PATENT DOCUMENTS

| | | | |
|---|---|---|---|
| DE | 102 26 989 | A1 | 1/2004 |
| DE | 10 2014 200 484 | A1 | 7/2015 |
| EP | 3 608 232 | A1 | 2/2020 |
| EP | 3 608 233 | A1 | 2/2020 |

* cited by examiner

*Primary Examiner* — Jeremy Carroll
(74) *Attorney, Agent, or Firm* — Walter Ottesen, P.A.

(57) ABSTRACT

A method is for producing individual dosing quantities of a powdered product via a drum dosing device. A dosing drum has a dosing opening on its circumference. In an ejection position, an ejection process is effected, the dosing opening being subjected to a positive pressure and the dosing quantity being thereby ejected from the opening, and an associated ejection reference time-point being determined. The individual mass of an ejected dosing quantity and an associated measurement reference time-point are determined via the measuring device. An actual time period is ascertained from the difference between the measurement reference time-point and the ejection reference time-point and compared with a specified time period. In dependence on the comparison, an adaptation of the positive pressure for a subsequent ejection process is performed such that the level of the positive pressure is increased if the actual time period is too great.

8 Claims, 2 Drawing Sheets

METHOD FOR PRODUCING INDIVIDUAL DOSING QUANTITIES VIA A DRUM DOSING DEVICE

CROSS-REFERENCE TO RELATED APPLICATIONS

This application claims priority of European patent application no. 23191975.4, filed Aug. 17, 2023, the entire content of which is incorporated herein by reference.

TECHNICAL FIELD

The disclosure relates to a method for producing individual dosing quantities of a powdered product via a drum dosing device.

BACKGROUND

In the field of pharmaceuticals, for example, but also in the field of food supplements or the like, powders are processed that have to be provided in precisely measured sub-quantities, or dosing quantities, for the intended form of administration. Target containers, for example in the form of blisters, two-part capsules or the like, are filled with such measured dosing quantities of a powdered product, such that the consumer has available and can consume the corresponding unit doses.

Such powdered products are converted, in particular on so-called drum dosing devices, into individually measured dosing quantities, which are then filled into respectively assigned target containers. Such a drum dosing device includes a dosing drum, which is provided on its circumference with at least one dosing opening, usually a plurality thereof, and the dosing openings are delimited on the inside via a filter element and can be subjected to a negative pressure through the filter element. Under the effect of the negative pressure, powder is drawn into the dosing openings, forming dosing quantities of the powder, the volume of which corresponds to the volume of the respective dosing opening. The dosing quantities formed in this way are then ejected from the dosing openings via positive pressure and forwarded to the target container.

It is clear from the above explanations that dosing via a drum dosing device is a volumetric dosing process. As a rule, however, it is sought to achieve dosing in which the measured dosing quantity has a determined mass within a permissible tolerance range. For volumetric dosing, it is therefore important that there is as repeatable a relationship as possible between the measured volume and the actual mass achieved.

So-called "Advanced Mass Verification" (AMV) systems are increasingly being used to check the actual dosing accuracy achieved, with a capacitive measuring device being used. The dosing quantity ejected from the dosing opening falls through a capacitive measuring section of the AMV system and thereby generates a capacitive measuring signal. When correctly calibrated, this measuring signal provides information about the mass of the dosing quantity and allows random or even 100% checking of the dosing process.

Known from US 2020/0047926 is a method in which a continuous determination of mass is performed with the aid of such an AMV system. Averaging is used to effect tendency closed-loop control of the negative suction pressure in order to achieve the most uniform possible filling of the dosing openings.

Nevertheless, such a method is not without its difficulties. For example, it has been shown that the dosing quantities are not always ejected uniformly. The dosing quantities in the form of a powder plug do not always dislodge uniformly when being ejected, which can result in different fall speeds and also in tumbling motions as they fall. As a consequence, this can falsify the measurement results of the AMV system or even result in faults in the dosing process as a whole.

SUMMARY

It is an object of the disclosure to specify a method via which the individual masses produced by a drum dosing device can be ejected and verified in a simple and controlled manner.

This object is, for example, achieved by a method for producing individual dosing quantities of a powdered product via a drum dosing device, the drum dosing device having a product feeder, a dosing drum, and a capacitive measuring device for determining a mass of the dosing quantities, the dosing drum defining a circumference and a dosing opening on the circumference, the dosing opening being delimited on an inner side via a filter element and being configured to be subjected to a negative pressure through the filter element. The method includes: rotating the dosing drum until the dosing opening is in a filling position; in the filling position, effecting a filling process in which the dosing opening is filled from the product feeder with a sub-quantity of the powdered product, the dosing opening being subjected to negative pressure through the filter element, and a dosing quantity of the powdered product forming in the dosing opening; rotating the dosing drum until the dosing opening filled with the dosing quantity is in an ejection position; in the ejection position, effecting an ejection process, the dosing opening being subjected to a positive ejection pressure through the filter element and the dosing quantity being thereby ejected from the dosing opening, and an associated ejection reference time-point being determined; determining an individual mass of an ejected dosing quantity and an associated measurement reference time-point via the capacitive measuring device; ascertaining an actual time period from the difference between the measurement reference time-point and the ejection reference time-point and comparing the actual time period with at least one specified time period; and, in dependence on the comparison of the actual time period with the at least one specified time period, performing an adaptation of the positive ejection pressure for a subsequent ejection process in that a level of the positive ejection pressure is increased if the actual time period is too great.

Provided according to the disclosure is a method that includes the following steps:

- the dosing drum is rotated until at least one dosing opening is in a filling position;
- in the filling position, a filling process is effected in which the dosing opening is filled from the product feeder with a sub-quantity of the powdered product, the dosing opening being subjected to negative pressure through the filter element, and a dosing quantity of the powdered product forming in the dosing opening;
- the dosing drum is rotated until the dosing opening filled with the dosing quantity is in an ejection position;
- in the ejection position, an ejection process is effected, the dosing opening being subjected to a positive ejection pressure through the filter element and the dosing quantity being thereby ejected from the dosing opening, and an associated ejection reference time-point being determined;

the individual mass of an ejected dosing quantity and an associated measurement reference time-point are determined via the capacitive measuring device;

an actual time period is ascertained from the difference between the measurement reference time-point and the ejection reference time-point and compared with at least one specified time period;

in dependence on the comparison of the actual time period with the at least one specified time period, an adaptation of the positive ejection pressure for a subsequent ejection process is performed in such a way that the level of the positive ejection pressure is increased if the actual time period is too great.

In other words, the comparison of the actual time period with the at least one specified time period is used to monitor process limits and as an error response. If the filter element slowly becomes clogged over time, the blow-out effect of a fixed positive ejection pressure is reduced. Dislodging of the powder quantity from the dosing opening becomes more difficult, which results in irregular fall motions with a reduced fall speed. In contrast, the adjustment of the positive ejection pressure according to the disclosure ensures that the dosing behavior and the fall speed of the ejected dosing quantity are kept as constant as possible. A largely constant speed with largely wobble-free movement of the dosing quantity in the measuring field of the capacitive measuring device, or of the associated AMV sensor, may be achieved by the method according to the disclosure, which consequently improves the precision of the determination of mass. In addition, the comparative measurements according to the disclosure enable extended process monitoring and an early response to emerging changes in the process. Furthermore, a statistical analysis of the individual comparative values by assessment of, for example, variance, range, et cetera, may serve as a criterion for process stability. A further aspect is that the transferability of process parameters between different drum dosing systems, for example from a laboratory machine to a production machine, is facilitated.

As the dosing quantity passes through the measuring section of the AMV sensor, a measuring signal having a time characteristic is generated. A suitable time-point, for example a start time-point or end time-point, may be selected as a measurement reference time-point. Preferably, the peak value, or maximum value, with an associated maximum-value time-point is determined from the time characteristic of the measuring signal, the measurement reference time-point being then set equal to the maximum-value time-point. The maximum-value time-point can be determined precisely and with high reproduction accuracy, which is favorable for the measurement accuracy.

It may be sufficient to define a particular time-point as a specified time-point at which the measurement reference time-point should lie, with deviations from this then resulting in the adjustment of the positive ejection pressure described above. In an embodiment, however, a tolerance is defined, in which case pressure adjustment is effected only when this tolerance is exceeded. Accordingly, an upper limit time period is formed from the upper tolerance value, and a first specified time period is formed from this. If the actual time period then exceeds the upper limit time period, the positive ejection pressure is increased. Defining a tolerance threshold avoids unnecessary interventions in the closed-loop control of the pressure due to minor pressure fluctuations that are normal in production.

The above refers mainly to the positive ejection pressure increasing as a result of the actual time period becoming too long. In practice, this is the expected case with slowly clogging filter elements and therefore a decreasing pressure effect. It may therefore be possible to dispense with a pressure adaptation in the opposite direction. Within the scope of the disclosure, however, it may be advantageous for that which has been stated above regarding pressure increase to be applied analogously to a pressure reduction, in which case an adaptation of the positive ejection pressure for a subsequent ejection process is thus effected, in dependence on the comparison of the actual time period with the at least one specified time period, in such a way that the level of the positive ejection pressure is reduced if the actual time period is too short. In particular, in this case a second specified time period is thus formed by a lower limit time period. If the actual time period then falls below the lower limit time period, a reduction of the positive ejection pressure is effected.

In a first variant, it may be expedient for the pressure adaptation to be effected incrementally in predefined pressure steps. The control input required for this is small, which helps to simplify process management. In an alternative variant, the pressure adaptation is effected on a functional basis and, in particular, in proportion to the deviation of the actual time period from the specified time period. In such a functional, in particular proportional adaptation, very precise readjustment is possible.

The pressure adaptation may be effected on the basis of random individual measurements. In an embodiment, the actual time period is formed by an average value of a plurality of measured differences between a measurement reference time-point and an ejection reference time-point, this average value then being compared with the at least one specified time period. The averaging compensates for isolated or short-term fluctuations in the measurement results that are irrelevant for process stability, such that consideration is given above all to the longer-term changes that are important for process management.

BRIEF DESCRIPTION OF DRAWINGS

The invention will now be described with reference to the drawings wherein.

DETAILED DESCRIPTION

Figure 1:
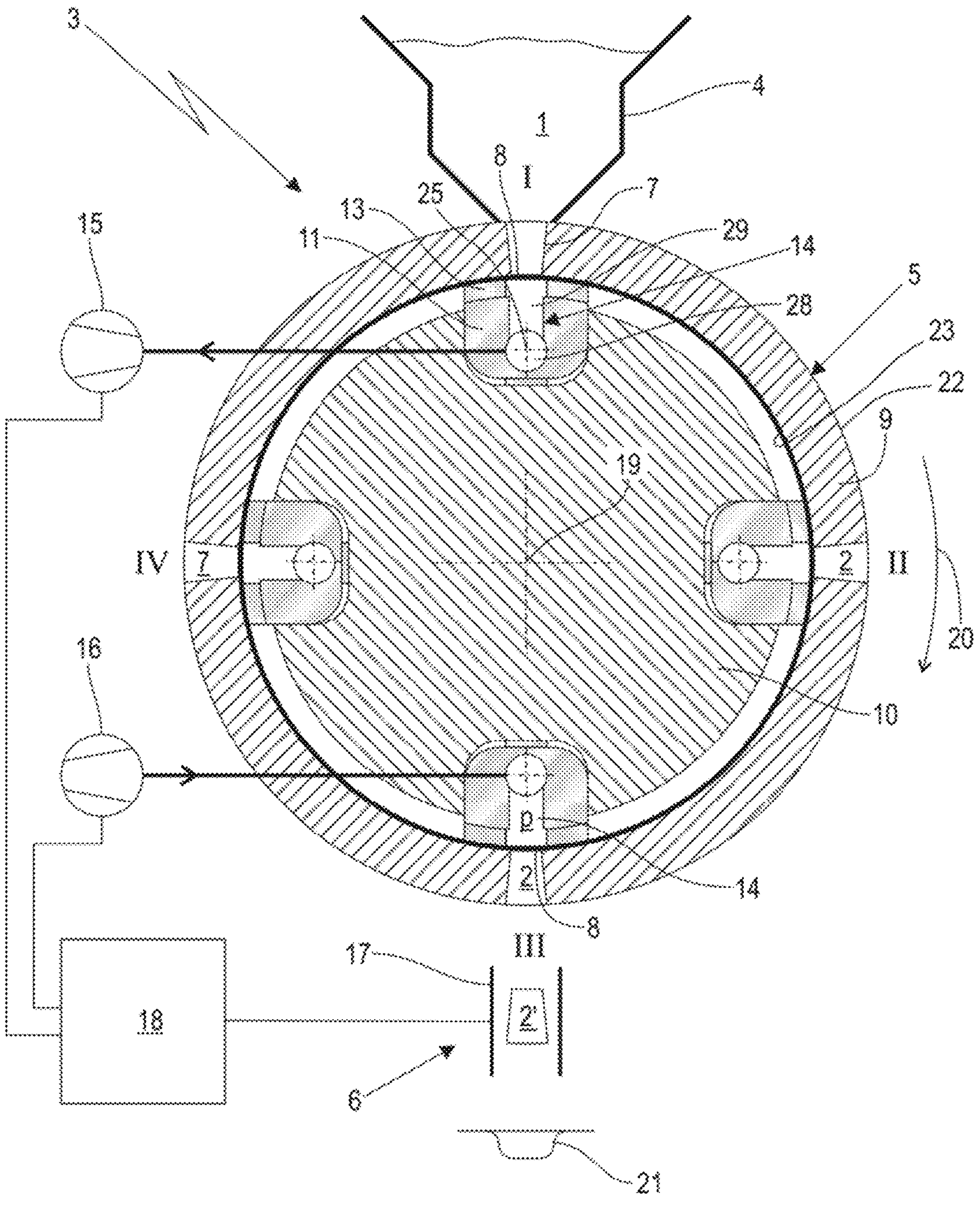
FIG. 1 shows a schematic cross-sectional representation of a drum dosing device including a product feeder, including a dosing drum and including a capacitive measuring device for determining the mass of the individual dosing quantities in the execution of the method according to the disclosure.

FIG. 1 shows a schematic cross-sectional representation of a drum dosing device 3 during the production of individual dosing quantities 2 of a powdered product 1 and for transferring such individual dosing quantities 2 into a target container 21. The powdered product in this case is a pharmaceutical powder. However, it may also be a powdered food supplement or the like. The target container 21 here is a schematically indicated blister that, after having been filled, is sealed with a cover film. Also possible as target containers 21, however, are two-part capsules or other containers.

The drum dosing device 3 includes a product feeder 4, a dosing drum 5 and a capacitive measuring device 6. The capacitive measuring device 6 is also referred to as an "Advanced Mass Verification System", or AMV system. The funnel-shaped product feeder 4 holds the powdered product 1 ready for measurement. Via the dosing drum 5, sub-quantities of the powdered product 1 are removed from the product feeder 4, and from these are formed volumetrically precisely defined dosing quantities 2. A subsequent determination of the mass of individual, in particular all, dosing quantities 2 is effected via the capacitive measuring device 6.

The dosing drum 5 extends along a longitudinal axis and is substantially cylindrical in relation to this longitudinal axis. On the circumference, it has at least one dosing opening 7. In the embodiment shown, the dosing drum 5 is provided with a plurality of dosing openings 7. Although not visible in the cross-sectional representation shown here, each three to twelve dosing openings 7 form a row of openings that extends axially parallel to the axis of rotation 19. Four such rows of openings are positioned at equal angular intervals, that is, at 90° in relation to each other, in the circumferential direction around the axis of rotation 19. One of each of the aforementioned rows of openings, that is, a total of four dosing openings 7, can be seen here. However, different numbers of dosing openings 7 in the axial direction and/or in the circumferential direction may also be expedient.

The dosing drum 5 has a central tension core 10 and a drum shell 9 surrounding the tension core 10 at a radial distance. The dosing openings 7 are realized as holes, having a basic circular contour, that extend radially through the drum shell 9. However, other basic contours may also be expedient. For example, the basic contour shape may be only partially round, oval, polygonal, rectangular or square. Radially outward, that is, on an outer side 22 of the drum shell 9, the dosing openings 7 are open. Radially inward, that is, on an inner side 23 of the drum shell 9, they are each delimited via a filter element 8, which corresponds in size and shape to the cross-section of the respective dosing opening 7 and forms the base thereof.

Corresponding to the number of the aforementioned rows of openings, the tension core 10 has a number of receiving grooves that extend parallel to the axis of rotation 19 and in each of which a filter strip 11 is held. There is an optional seal 13 attached between the filter strip 11 and the inner side 23 of the drum shell 9.

Realized in each of the filter strips 11 there is a branched pressure channel 14 that leads through the filter elements 8 into corresponding dosing openings 7. The pressure channel 14 includes a main channel 28 and at least one branch 29. In the embodiment, the pressure channel 14 includes twelve branches 29, corresponding to a respective number of dosing openings 7 within an axially parallel row thereof. The main channel 28 extends along a longitudinal axis 25 of the pressure channel 14. The longitudinal axis 25 is parallel to the axis of rotation 19 of the dosing drum 5. Starting from the main channel 28, the branches 29 of the pressure channel 14 extend, radially with respect to the axis of rotation 19, to the dosing openings 7.

The filter elements 8 are formed together by a sheet of suitable filter material that is wrapped around the tension core 10 with the filter strips 11. Glued-on filter elements 8 may also be used. Via a tension cone, not shown, the filter strips 11 are tensioned radially outward against the inner side of the drum shell 9, with the filter material placed in-between. On the one hand, the seals 13 in this case press the filter material against the inner side of the drum material, while on the other hand, around the respective filter element 8, they seal off the associated branch 29 of the pressure channel 14, as well as the respective dosing opening 7, from the surroundings. This ensures that pressure equalization between the dosing opening and the pressure channel 14 is effected solely through the associated filter element 8, and that a determined wanted pressure can thus be applied to the dosing openings, via the associated pressure channel 14, through the respective filter element 8.

The dosing drum 5 is mounted so as to be rotatable, about an axis of rotation 19, in the direction of an arrow 20 and is provided with an associated rotary drive, not represented here. In operation, the dosing drum is rotated in a clocked manner, with the individual dosing openings 7 coming to rest cyclically, in at least two clock cycles, in an upper filling position I in the direction of the weight force and a lower ejection position III in the direction of the weight force. Instead of a clocked movement, continuous rotation may also be expedient. In the embodiment shown, the individual dosing openings 7 pass cyclically through four different positions in four clock cycles, starting with the upper filling position I, followed by a first intermediate position II. This is followed by the lower ejection position III and a second intermediate position IV, before the cycle starts again at the upper filling position I. In the upper filling position I, the respective dosing opening 7 is filled with the powdered product 1, forming a dosing quantity 2 from the product feeder 4. In the following first intermediate position II, a fill level check may optionally be performed. In the lower ejection position III, the dosing quantity 2 is ejected from the dosing opening 7 and delivered to the target container 21. The now emptied dosing opening 7 is moved on to the second intermediate position IV, where it may optionally be cleaned, for example by being blown out.

If required, the dosing openings 7 can be subjected on the inside and through the respective filter element 8 to a negative pressure. For this purpose, at least in the filling position 41, a connection transmitting a negative pressure is established between the pressure channel 14 and a negative-pressure source 15. The level of the negative pressure provided by the negative-pressure source 15 is set via a schematically indicated control device 18, which may be effected by a suitable open-loop control, but possibly also by a closed-loop control. In any case, the negative pressure set in this way is transmitted through the pressure channel 14 and the filter element 8 into the dosing opening 7 when the latter is in the upper filling position 41. The negative pressure draws the powdered product 1 out the product feeder 4 and into the dosing opening 7. The filter element 8 is dimensioned with respect to its permeability and matched to the product 1 in such a way that, although it is permeable to air and thus also transmits pressure, the powdered product 1 is retained and prevented from passing through. Consequently, a dosing quantity 2 of the powdered product 1 is produced, which completely fills the dosing opening 7 and the volume of which corresponds to the volume of the dosing opening 7. The filling process may also optionally be assisted by an agitator in the product feeder 4, which is not represented. Depending on the level of the prevailing negative pressure and the properties of the product 1, a certain degree of compaction of the product 1 occurs in any case in the dosing opening 7, such that the predefined volume of the dosing opening 7 also results in a particular mass of the dosing quantity 2.

The negative pressure that is present may be maintained at the same level or even at a reduced level until the ejection position III is attained, in order to prevent the dosing quantity 2 from falling out of the dosing opening 7 prematurely. At the latest, however, the application of the negative pressure is stopped when the lower ejection position III is attained. Instead, the dosing opening 7 in the ejection position 43 is now subjected to a positive pressure, namely a positive ejection pressure p, through the filter element 8. For this purpose, a connection transmitting a positive pressure is established between the pressure channel 14 and a positive-pressure source 16. The level of the positive pressure provided by the positive-pressure source 16 is set via the schematically indicated control device 18, just as in the aforementioned case of the negative-pressure source. The positive pressure set in this way is transmitted through the pressure channel 14 and the filter element 8 into the dosing opening 7 when the latter is in the lower ejection position III. The positive pressure, as a positive ejection pressure p, blows the dosing quantity 2 out of the dosing opening 7. In addition, the application of the positive pressure may also be used in the subsequent second intermediate position IV for the process of cleaning the emptied dosing opening 7.

Part of the capacitive measuring device 6, already mentioned above, for determining the mass of the individual dosing quantities 2 is a capacitive sensor 17 that is likewise connected to the control device 18. In the control device 18, the measurement data of the capacitive sensor 17 are sensed and analyzed, which results overall in the formation of the measuring device 6. Instead of a capacitive measuring device 6, however, another suitable measuring device may also be used to determine the individual masses of the dosing quantities 2. In any case, the dosing quantities ejected from the dosing opening 7 in the lower ejection position III, here denoted by 2', fall through the sensor, in this case through the capacitive sensor 17, into the target container 21. The mass of the dosing quantity 2 passing through is determined from the field change effected in the capacitive sensor 17 in accordance with an AMV system (Advance Mass Verification System). For the implementation of the method according to the disclosure, it is not absolutely necessary for the mass of each individual dosing quantity 2 ejected to be determined. Rather, it may be sufficient if individual determinations of mass are repeated only after a number of dosing cycles. Preferably, however, a determination of mass is performed for 100% of the measured dosing quantities 2.

Figure 2:
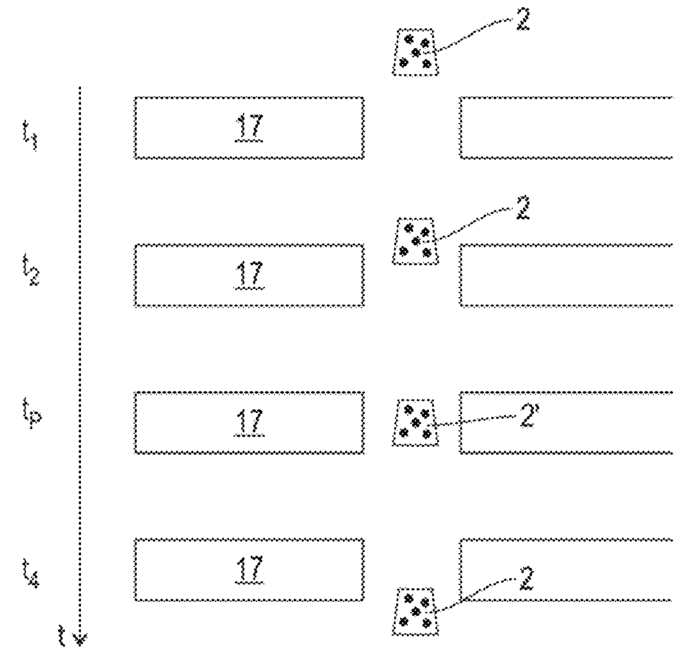
FIG. 2 shows a schematic phase representation of an individual dosing quantity at different time-points during passage through the measuring section of the capacitive measuring device according to FIG. 1; and, FIG. 3 shows a diagrammatic representation of the signal characteristic of the capacitive measuring device according to FIG. 1, with the different time-points according to FIG. 2 and with intermediate time periods, for execution of the method according to the disclosure.
Figure 3:
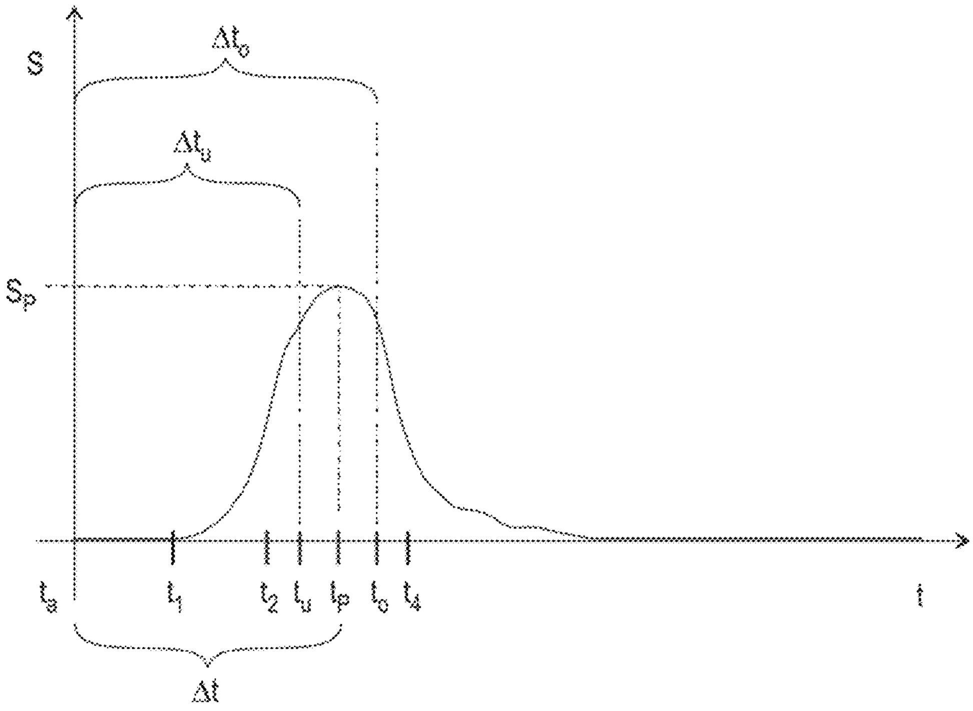

FIG. 2 shows a schematic phase representation of a single dosing quantity 2 as it approaches and passes through the measuring section of the capacitive sensor 17. According to the method of the disclosure, via the capacitive measuring device 6 and its capacitive sensor 17 as part thereof, a time characteristic of a measuring signal S is recorded as the dosing quantity 2 passes through, which in FIG. 3 is represented in the form of a schematic diagram. Indicated in the diagram according to FIG. 3 is an ejection time-point $t_a$ at which the ejection of the dosing quantity 2 is effected in the ejection position III according to FIG. 1. In the present case, this is the time-point at which the control device 18 gives the signal to switch on the positive ejection pressure p to the dosing opening 7 in the ejection position III. Alternatively, however, it may also be expedient to ascertain, via a suitable sensor, the time-point of the actual build-up of positive pressure or of the actual ejection and to take this as the ejection time-point $t_a$.

Furthermore, when FIGS. 2 and 3 are viewed together, it can be seen that, at a first time-point $t_1$, the dosing quantity 2 is located directly at the upper input of the capacitive sensor 17 and does not yet generate a measuring signal S at this point. At the time-point $t_1$, the magnitude of the measuring signal S is still approximately zero. Subsequently, at a second time-point $t_2$, the dosing quantity 2 is located in the input section of the measuring section of the capacitive sensor 17, the measuring signal S having an ascending characteristic, and at the fourth time-point $t_4$ it is located in the output section of the measuring section of the capacitive sensor 17, the measuring signal S having a descending characteristic.

Approximately in the middle in-between, the quantity denoted here as the dosing quantity 2' generates a peak value, or a maximum value $S_p$ of the measuring signal S, from which an associated maximum-value time-point $t_p$ is determined as the third time-point according to the diagram in FIG. 3. The time difference between the ejection time-point $t_a$ and the maximum-value time-point $t_p$ is now formed and taken as the actual time period $\Delta t$ for the duration until the maximum value $S_p$ is attained.

According to the method of the disclosure, this actual time period $\Delta t$ is compared with at least one specified time period. Such a specified time period may be a single predefined target time period. In the present case, as shown in FIG. 3, a tolerance range was used instead of a discrete value. For this purpose, an upper limit time period $\Delta t_o$, from the ejection time-point $t_a$ to the upper limit time-point $t_o$, was set as a first specified time period. In addition, a lower limit time period $\Delta t_u$, from the ejection time-point $t_a$ to the lower limit time-point $t_u$, was set as a second specified time period.

The upper limit time period $\Delta t_o$ and the lower limit time period $\Delta t_u$ delimit a tolerance range for the actual time period $\Delta t$. If the actual time period $\Delta t$ is within this tolerance range, that is, if the maximum-value time-point $t_p$ is between the upper limit time-point $t_o$ and the lower limit time-point $t_u$, as in the representation in FIG. 3, then the dosing process described above in connection with FIG. 1 remains unaffected.

If, however, the aforementioned time period comparison shows that the actual time period $\Delta t$ exceeds the upper limit time period $\Delta t_o$, that is, that the maximum-value time-point $t_p$ is above the upper limit time-point $t_o$, then this is a sign that the blow-out and fall speed of the dosing quantity 2 is too low. As a consequence and to compensate for this, according to the method of the disclosure the positive ejection pressure p is increased. The increase in the positive ejection pressure p is effected in such a way that, or until, the actual time period $\Delta t$ is again within the tolerance range described above.

Similarly, an adaptation of the positive ejection pressure p is also effected in the opposite direction: if the time period comparison shows that the actual time period $\Delta t$ falls below the lower limit time period $\Delta t_u$, that is, that the maximum-value time-point $t_p$ is below the lower limit time-point $t_u$, then this is a sign that the blow-out and fall speed of the dosing quantity 2 is too high. As a consequence and to compensate for this, according to the method of the disclosure the positive ejection pressure p is reduced. The reduction of the positive ejection pressure p is effected in such a way that, or until, the actual time period $\Delta t$ is again within the tolerance range described above.

Ultimately, therefore, the disclosure is concerned with keeping the measured actual time period Δt as constant as possible, or at least within a predefined tolerance range. If an adaptation of the positive ejection pressure p is required for this purpose, this adaptation (increase or decrease) may be effected incrementally in fixed predefined pressure steps. Alternatively, the method according to the disclosure provides for an adaptation proportional to the deviation of the actual time period Δt from the specified time value.

The adaptation may be effected on the basis of random individual time measurements. In the embodiment described above, the actual time period Δt is formed by an average value of a plurality of measured differences between a measurement reference time-point and the ejection reference time-point $t_a$, this average value then being compared with the at least one specified time period.

The comparison result may be displayed to the operating personnel, so that they can effect a manual adaptation of the positive ejection pressure p. In the present case, an automatic adaptation of the positive ejection pressure p is effected via the control device 18, into which the measurement data of the capacitive measuring device 6 are fed, thereby then forming an automatic closed-loop control circuit.

It is understood that the foregoing description is that of the preferred embodiments of the invention and that various changes and modifications may be made thereto without departing from the spirit and scope of the invention as defined in the appended claims.

The invention claimed is:

1. A method for producing individual dosing quantities of a powdered product via a drum dosing device, the drum dosing device having a product feeder, a dosing drum, and a capacitive measuring device for determining a mass of the dosing quantities, the dosing drum defining a circumference and a dosing opening on the circumference, the dosing opening being delimited on an inner side via a filter element and being configured to be subjected to a negative pressure through the filter element, the method comprising:

rotating the dosing drum until the dosing opening is in a filling position;

in the filling position, effecting a filling process in which the dosing opening is filled from the product feeder with a sub-quantity of the powdered product, the dosing opening being subjected to negative pressure through the filter element, and a dosing quantity of the powdered product forming in the dosing opening;

rotating the dosing drum until the dosing opening filled with the dosing quantity is in an ejection position;

in the ejection position, effecting an ejection process, the dosing opening being subjected to a positive ejection pressure through the filter element and the dosing quantity being thereby ejected from the dosing opening, and an associated ejection reference time-point being determined;

determining an individual mass of an ejected dosing quantity and an associated measurement reference time-point via the capacitive measuring device;

ascertaining an actual time period from the difference between the measurement reference time-point and the ejection reference time-point and comparing the actual time period with at least one specified time period; and, in dependence on the comparison of the actual time period with the at least one specified time period, performing an adaptation of the positive ejection pressure for a subsequent ejection process in that a level of the positive ejection pressure is increased if the actual time period is too great.

2. The method of claim 1 further comprising:

recording, via the capacitive measuring device, a time characteristic of a measuring signal as the dosing quantity passes through;

determining a maximum value with an associated maximum value time-point from the time characteristic of the measuring signal; and, setting the measurement reference time-point equal to the maximum value time-point.

3. The method of claim 1, wherein a first specified time period is formed by an upper limit time period, and, if the actual time period exceeds the upper limit time period, the positive ejection pressure is increased.

4. The method of claim 1, wherein, in dependence upon the comparison of the actual time period with the at least one specified time period, the adaptation of the positive ejection pressure for a subsequent ejection process is performed such that the level of the positive ejection pressure is reduced if the actual time period is too short.

5. The method of claim 4, wherein a second specified time period is formed by a lower limit time period, and, if the actual time period falls below the lower limit time period, a reduction of the positive ejection pressure is effected.

6. The method of claim 1, wherein the adaptation of the positive ejection pressure is effected incrementally in predefined pressure steps.

7. The method of claim 1, wherein the adaptation of the positive ejection pressure is effected in proportion to a deviation of the actual time period from the at least one specified time period.

8. The method of claim 1, wherein the actual time period is formed by an average value of a plurality of measured differences between the measurement reference time-point and the ejection reference time-point; and, the average value is compared with the at least one specified time period.

* * * * *